US009650738B2

(12) United States Patent
Cavalli et al.

(10) Patent No.: US 9,650,738 B2
(45) Date of Patent: May 16, 2017

(54) LAUNDRY MACHINE HAVING LOWER RESERVOIR AND WASHING PROCESSES FOR A LAUNDRY MACHINE

(75) Inventors: Cirilo Alex Cavalli, Curitiba (BR); Marcelo Piekarski, Curitiba (BR)

(73) Assignee: Electrolux Do Brazil S.A., Curitiba PR (BR)

( * ) Notice: Subject to any disclaimer, the term of this patent is extended or adjusted under 35 U.S.C. 154(b) by 370 days.

(21) Appl. No.: 14/238,601

(22) PCT Filed: Aug. 15, 2012

(86) PCT No.: PCT/BR2012/000293
§ 371 (c)(1),
(2), (4) Date: Jun. 9, 2014

(87) PCT Pub. No.: WO2013/023267
PCT Pub. Date: Feb. 21, 2013

(65) Prior Publication Data
US 2014/0345063 A1    Nov. 27, 2014

(30) Foreign Application Priority Data
Aug. 15, 2011 (BR) .................................... 1104148

(51) Int. Cl.
*D06F 39/08* (2006.01)
*D06F 39/00* (2006.01)
(Continued)

(52) U.S. Cl.
CPC .......... *D06F 39/006* (2013.01); *D06F 35/006* (2013.01); *D06F 39/083* (2013.01);
(Continued)

(58) Field of Classification Search
CPC .... D06F 39/083; D06F 39/006; D06F 35/006; D06F 35/005; D06F 35/001; D06F 35/002; Y02B 40/56
(Continued)

(56) References Cited

U.S. PATENT DOCUMENTS

| 4,835,994 A | 6/1989 | Ishida et al. |
| 5,241,843 A | 9/1993 | Hein |

(Continued)

FOREIGN PATENT DOCUMENTS

| CN | 1727556 A | 2/2006 |
| CN | 201500088 U | 6/2010 |

(Continued)

OTHER PUBLICATIONS

Machine translation of WO2009141218, dated Nov. 2009.*
(Continued)

*Primary Examiner* — Joseph L Perrin
*Assistant Examiner* — Kevin G Lee
(74) *Attorney, Agent, or Firm* — Banner & Witcoff, Ltd.

(57) ABSTRACT

A laundry machine and a washing process allow the storage of water from prior washes, in order to minimize the consumption of water destined for laundry washing. According to an embodiment, the laundry machine includes an impeller (201); a wash tub (202); a mechanical and/or electric drive element of the impeller and of the tub; and at least a tank (203) encircling the wash tub. There is additionally a reservoir (300) in fluid communication (250) with the tank and disposed below the tank and the wash tub and encircling, at least partially, the mechanical and/or electric drive element of the impeller and the tub.

8 Claims, 7 Drawing Sheets

(51) Int. Cl.
*D06F 35/00* (2006.01)
*D06F 37/40* (2006.01)
*D06F 17/06* (2006.01)
*D06F 23/04* (2006.01)

(52) U.S. Cl.
CPC .............. *D06F 17/06* (2013.01); *D06F 23/04* (2013.01); *D06F 37/40* (2013.01); *Y02B 40/56* (2013.01)

(58) Field of Classification Search
USPC ............................................. 8/159; 68/12.13
See application file for complete search history.

(56) References Cited

U.S. PATENT DOCUMENTS

| | | | |
|---|---|---|---|
| 5,285,665 A | | 2/1994 | Hetrick |
| 5,573,677 A | * | 11/1996 | Dembrosky .............. C02F 1/50 |
| | | | 210/128 |
| 5,617,885 A | * | 4/1997 | Centis ................. A47L 15/4291 |
| | | | 134/111 |
| 2006/0021393 A1 | | 2/2006 | Oda et al. |
| 2012/0266388 A1 | * | 10/2012 | Pollett .................. D06F 39/004 |
| | | | 8/137 |

FOREIGN PATENT DOCUMENTS

| | | | |
|---|---|---|---|
| DE | 4104450 | 8/1992 | |
| EP | 0909848 | 4/1999 | |
| ES | WO 2009141218 A1 * | 11/2009 | ........... D06F 39/006 |
| FR | EP 2312045 A1 * | 4/2011 | ........... D06F 39/083 |
| GB | 2416779 | 2/2006 | |
| WO | 2008/079070 | 7/2008 | |

OTHER PUBLICATIONS

Jan. 29, 2016 (CN) Second Office Action—App 201280039914.8.
International Search Report and Written Opinion mailed Jan. 4, 2013 in corresponding International Application No. PCT/BR2012/000293.
International Search Report mailed Jan. 4, 2013 in corresponding International Application No. PCT/BR2012/000293.

* cited by examiner

LAUNDRY MACHINE HAVING LOWER RESERVOIR AND WASHING PROCESSES FOR A LAUNDRY MACHINE

FIELD OF THE INVENTION

The invention pertains, in a general manner, to laundry machines and, more particularly, the invention pertains to a laundry machine and to a washing process that allows the storage of water from prior washes, in order to minimize the consumption of water destined for laundry washing.

BACKGROUND OF THE INVENTION

Laundry machines are domestic or industrial utensils widely used to assist in cleaning clothing or fabrics. Among the laundry machines, certain constructive embodiments are known, such as small tanks, front loading machines and top loading machines.

The so-called "small tanks" refer, generally, to a device substantially in the shape of a common tank, but which have a small turbine coupled to a motor, both mounted on the lower portion of the tank. The motor with the turbine just has the function of agitating the water contained on the inside, in order to assist in the process of washing the fabrics, but other automated functions related to the washing cycle, such as the rinse, spin etc. are not present. These small tanks are normally devices of simple construction, and generally also do not present specific compartments to store and dispense products for cleaning and fabric care, such as soap, softener, bleach etc.

In relation to the washing machines that comprise full wash cycles, such as the steps of washing, rinsing, spinning, etc., front loading and top loading are the ones mainly known.

Front loading machines present the opening and door to access inside the machine, where the wash tub is contained, in the front part of the machine, while in top loading ones, access inside the washing compartment is made by an opening in the upper portion of the machine.

However, working principle of these laundry machine models is similar, and consists of a perforated tub, in order to allow the passage of water and/or of the cleaning agents of the fabrics, and the agitation of the fabrics inside the wash tub in two directions, both clockwise and anti-clockwise. After washing and rinsing, normally there is a spin cycle, which is designed to eliminate the excess water contained in the fabrics, so as to facilitate the subsequent drying thereof. In the spin cycle, the tub rotates in just one direction at a relatively high rotation, such as 500, 1,000 RPM or more.

Although the front and top loading machines present similar working principles, as described above, there is a substantial difference in their constructions. For front loading machines, the rotation axis of the tub is in a horizontal position centralized thereto, and the tub moves and the laundry agitate inside the tub due to the action of gravity, that is, the fabrics contained inside the wash tub have a natural tendency to displace to the lower part of the tub while it is turning. Wings mounted on the inner sides of the tub can also be used to assist the agitation of laundry.

On the other hand, in top loading machines, the wash tub generally is stopped, and the rotation axis of the drive motor is in a vertical position. Due to the action of gravity, since clothes tend to agglomerate at the bottom of the tub, it is necessary to create a mechanical action in order to assist the agitation of the clothes. Accordingly, said top loading machines generally present a central element, mounted inside the tub and coinciding with the centerline of the rotary axis of the drive motor. This element can be an impeller. The impeller, as the name itself suggests, has the function of creating a movement of the water inside the tub and create a mechanical action in the clothes in order to assist in the cleaning of the fabrics and avoid accumulating in the lower portion of the tub. For this purpose, it is common for impellers to have hydrodynamic profiles to promote agitation of the water and of the fabrics inside the tub when immersed in water.

Today there is a growing concern for so-called 'green' products and services or, in other words, products and/or services that help minimize the environmental impact by their use or manufacturing. The consumers are evermore appreciative of products and services that bear differentiating aspects relating to protection or to care with the environment. Oftentimes, these "green" characteristics can be the competition difference between one product or service in relation to its competitors.

In the case of laundry washing machine, there is also a growing need to offer a product that consumes a lesser quantity of water during a washing cycle, to minimize the environmental impact relating to the washing and to the care of the fabrics.

Document U.S. Pat. No. 5,241,843 presents a laundry machine that uses reservoirs mounted on the side of the machine to store and reuse the water from prior washes. However, in the embodiment shown in this document, the size, and particularly the width, of the machine is significantly increased due to the water storage tanks, which makes the device extremely large and hardly practical to use, chiefly for inhabitants of large urban centers, who tend to live in ever smaller constructed areas.

Publication WO 2008/079070 discloses a laundry machine that is designed to save water during washing, but the storage of the water is only carried out in the tank that encircles the wash tub, and accordingly makes use of pumps to maintain the level of water inside the tank below the level of the tub to allow the recirculation of water. The proposed solution, therefore, is hardly practical because it requires the constant use of recirculation pumps and is limited in relation to the quantity of water that can be stored.

The present invention is designed to overcome these drawbacks, among others.

DESCRIPTION OF THE INVENTION

In this sense, in order to overcome the drawbacks cited above, among others, the invention proposes a laundry machine that comprises:
  at least an impeller;
  at least a wash tub;
  at least a mechanical and/or electric drive element of said impeller and of said tub; and
  at least a tank encircling said wash tub, characterized by additionally comprising a reservoir in fluid communication with said tank and disposed below said tank and said wash tub and encircling, at least partially, said mechanical and/or electric drive element of said impeller and said tub.

According to alternative or additional embodiments of the present invention, the laundry machine may comprise, alone or in combination, the following characteristics:
  said mechanical and/or electric drive element of said impeller and of said tub is a drive motor;
  said mechanical and/or electric drive element of said impeller and of said tub is a reduction gearbox coupled to said motor by way of a clutch;

said wash tub is a substantially hole-free tub;
said wash tub is a tub with holes;
said reservoir is a separate part of said tank;
said reservoir is a solidary part of said tank;
said reservoir and said tank are a single part;
said reservoir comprises at least an outflow for water recirculating and draining;
said reservoir comprises two outflows, one for recirculating water in fluid communication with said tub and for draining the water;
said outflow in fluid communication with said tub is also in fluid communication with a device to store and dispense cleaning agents;
said machine additionally comprises an inflow of water from the mains;
said inflow of water from the mains is in fluid communication with a device to store and dispense cleaning agents and with said tank;
said machine also comprises a cover fixed on the upper portion of said tub and which covers up the space existing between the tub and the tank;
said machine additionally comprises a pressure switch to determine the quantity of water existing inside the reservoir;
said machine also comprises a recirculation pump in fluid communication with an outflow of the reservoir and said tub;
said machine additionally comprises a draining pump in fluid communication with said second outflow of the reservoir and the sewage system; and
said machine is a top-loading washing machine.

The invention also pertains to a washing process for a laundry machine as defined above, wherein the process comprises the steps of:

(a) verifying the existence of water in the reservoir, before starting the washing cycle; and
(b) filling the reservoir with water from the mains, before the transfer step (c), if there is no water in the reservoir; or
(c) transferring water from the reservoir to the inside of the tub, if there is water in the reservoir; and
(d) carrying out the step of washing or rinsing; and
(e) spinning to withdraw the water from the inside of the tub; and
(f) verifying whether the spin of step (e) is the last spin of the washing cycle; and
(g) draining the water, if it is not the last spin and return to step (b); or
(h) storing the water, if it is the last spin.

According to a second embodiment of the invention, the washing process for a laundry machine as described above comprises the steps of:

(a) verifying the existence of water in the reservoir, before starting the washing cycle; and
(b) filling the reservoir with water from the mains, before the transfer (c), if there is no water in the reservoir; or
(c) transferring water from the reservoir to the inside of the tub, if there is water in the reservoir; and
(d) perform the step of washing and/or rinsing; and
(e) spinning to withdraw the water from the inside of the tub; and
(k) verifying whether the water withdrawn from the tub of step (e) is the water from the first wash; and
(l) draining the water (514), if it is the water from the first wash and return to step (a); or
(m) verifying whether the spin of step (e) is the last spin of the washing cycle; and
(n) draining the quantity of water exceeding the reservoir storage capacity, if it is not the last spin of the washing cycle, and return to step (a) or (c); or
(o) storing the water, if it is the last spin of the washing cycle.

According to additional or alternative embodiments of the processes of the invention, the following characteristics, alone or in combination, may be present.

the process additionally comprises the step of (i) verifying whether softener was used in the washing cycle, if the spin of step (e) was the last of the washing cycle;
the process additionally comprises the step of (j) draining the water, if softener was used in the washing cycle, verified in step (i);
the process additionally comprises the step of completing the water level with water from the mains after step (c);
the process additionally comprises the step of draining water from the reservoir after step (c); and
the process additionally comprises the step of cleaning and/or sterilizing the stored water.

BRIEF DESCRIPTION OF THE DRAWINGS

The invention shall now be described in relation to its particular embodiments, drawing references to the accompanying drawings. Said drawings are schematic, and their sizes and proportions may not correspond to reality, since they are merely designed to describe the invention in a didactic manner. Therefore, the drawings presented do not have a limitative character beyond that defined by the claims ahead, wherein:

DESCRIPTION OF PARTICULAR EMBODIMENTS OF THE INVENTION

Figure 1:
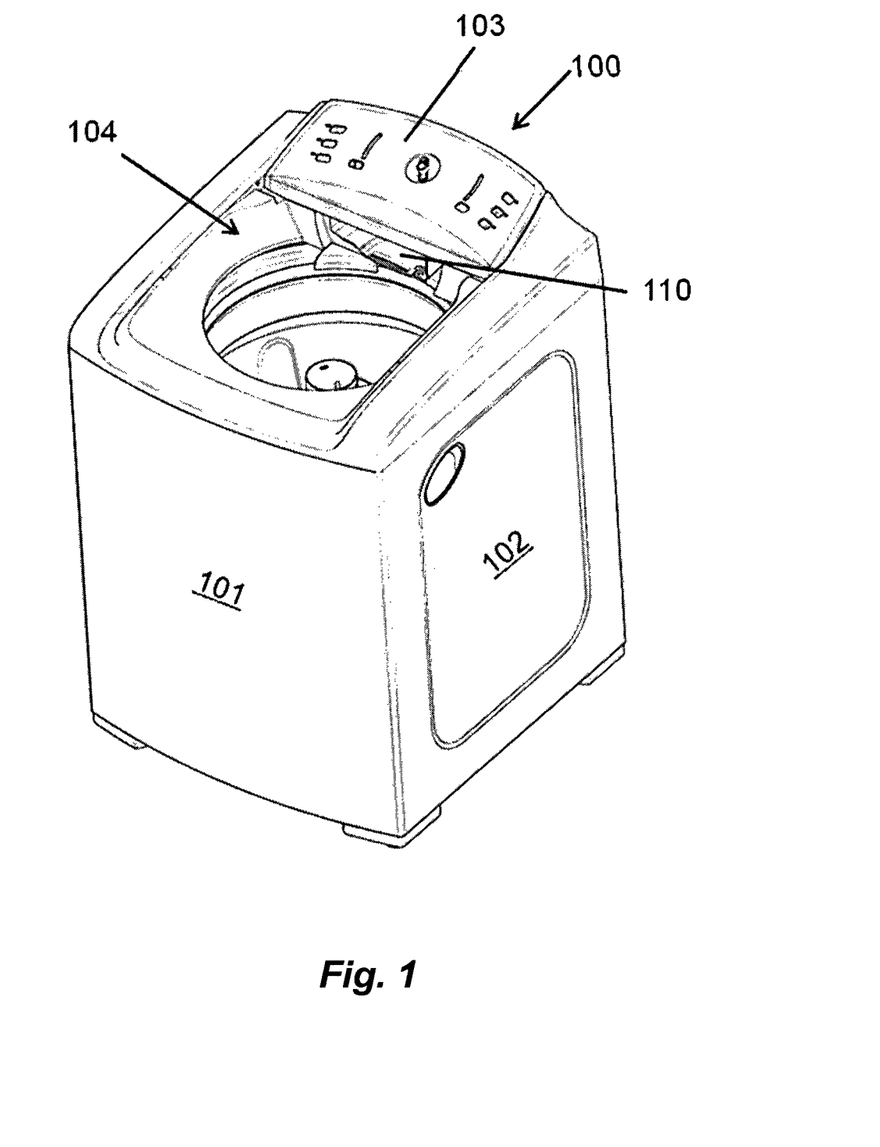
FIG. 1 is a perspective view of a top loading laundry machine.

FIG. 1 shows a perspective view of a laundry machine (100), particularly a top loading laundry machine for domestic use. Said machines generally comprise frontal and posterior side panels (101, 102) which form the cabinet, an upper opening (104) generally having a lid and whereby it is possible to have access to the inside of the wash tub, and a control panel (103), in which there are disposed the commands for selecting the washing cycles, according to the user preference or according to the types of fabrics that are washed, such as delicate fabrics, heavy washing etc. There can also be provided a drawer or compartment (110) which is part of a device to store and dispense cleaning agents (301), destined for the storage and dispensing of cleaning agents or fabric care.

According to the present specification, the term "cleaning agents" should be interpreted as all and any products destined for cleaning and/or fabric care, such as, but not limited to, soap powder, liquid detergent, softener, bleach etc. which are dispensed inside the wash tub in a controlled manner according to the step of the washing cycle.

Further according to the present specification, the term "washing cycle" defines one or more steps that comprise a cleaning cycle and fabric care in a laundry machine, such as, but not limited to, washing, rinsing, spinning, drying, etc.

Figure 2:
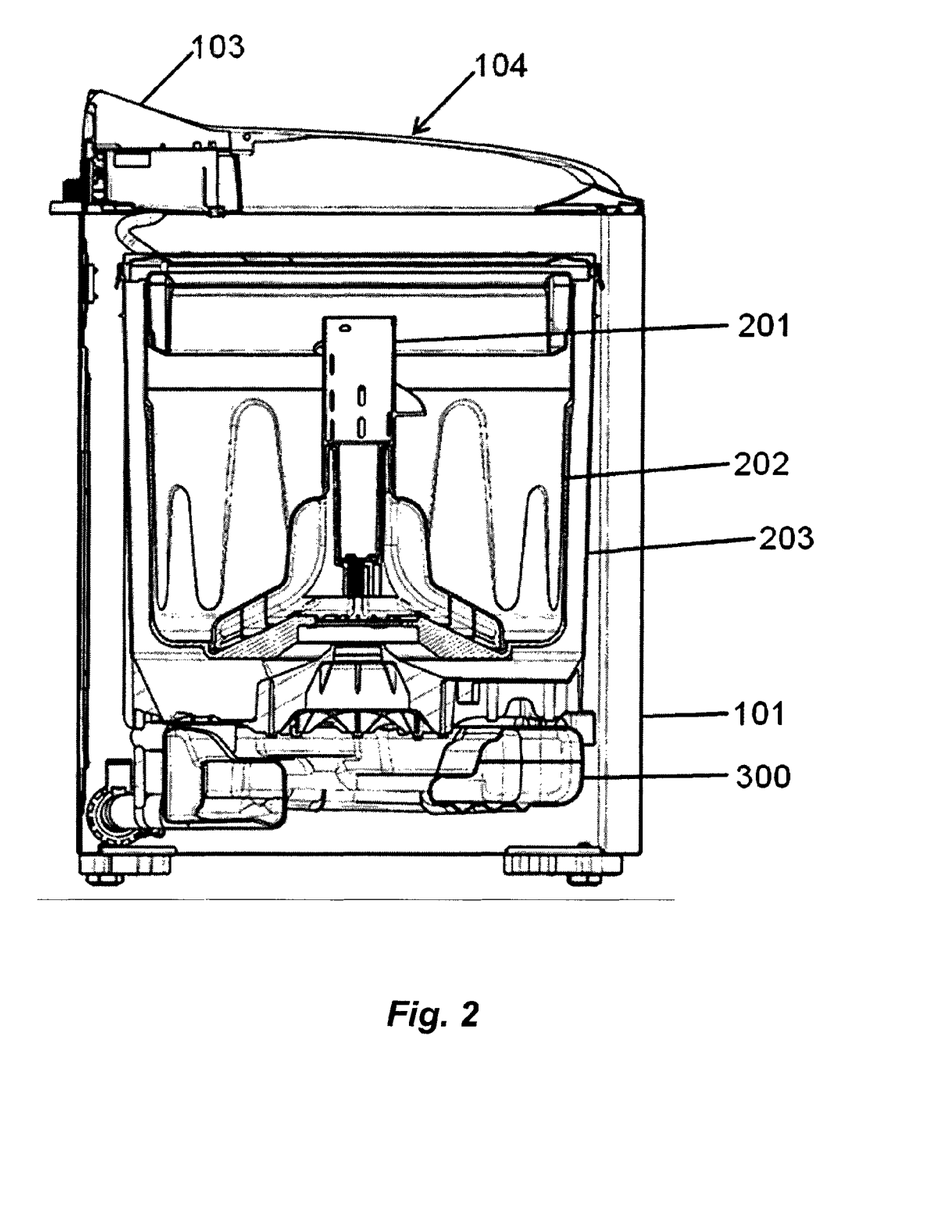
FIG. 2 is a side cross-section of the inside of a laundry machine as per an embodiment of the invention.

FIG. 2 is a cross-sectional view of the inside of a top-loading washing machine, such as the machine represented in FIG. 1, but according to an embodiment of the invention. There are represented therein the panels (101 and 102), the upper opening (104) with a lid, the tank (203), the wash tub (202) and the impeller (201). However, for didactic purposes, for an improved understanding of the object of the invention, some constructive examples were omitted and in the following drawings such as, for example, structural elements, fixing the tank and the wash tub, and mechanical and/or electrical drive elements of the impeller and of the tub, which generally comprise an electric motor coupled to a planetary reduction gearbox by means of a clutch. Alternatively, an induction motor can be used, powered by frequency inverters, whereby eliminating the clutch. Said drive elements of the impeller and of the tub are known to persons skilled in the art.

Still in relation to FIGS. 1 and 2, the laundry machine according to the invention, as mentioned, comprises an upper opening (104), through which there are inserted and withdraw the fabrics for washing, a wash tub (202) and an impeller (201). A tank (203) encircles the wash tub and, in the lower portion, below the wash tub, the impeller and the tank, there is provided a motor, generally an electric motor, associated to a clutch and reducer combination (not represented) which make the drive both of the impeller and the wash tub, as per the cycle in progress, be it the washing cycle, in which the impeller agitates in alternative rotary movements inside the wash tub, or in the spin cycle, in which the impeller and the tub rotate solitarily generally in just one turning direction. These mechanical and/or electrical drive elements of the impeller and of the wash tub are generally aligned according to the vertical central shaft of the impeller.

Such characteristics thus far described are common to the majority of top loading laundry machines known in the state of the art.

However, the invention also proposes that the laundry machine comprises the water storage reservoir (300), particularly provided below the tank (203) and the wash tub (202) and encircling, at least in part, the clutch and reducer combination as well as the electrical motor (not shown), in other words, encircling the mechanical and/or electrical drive elements of the tub and/or of the impeller.

As in the illustrated embodiment, the reservoir (300) is an independent part of the tank (203), but both the reservoir and the tank can be shaped into a solidary part or the reservoir (300) may even be formed in the tank itself and, in this case, there would be no walls separating the reservoir of the tank.

Figure 3:
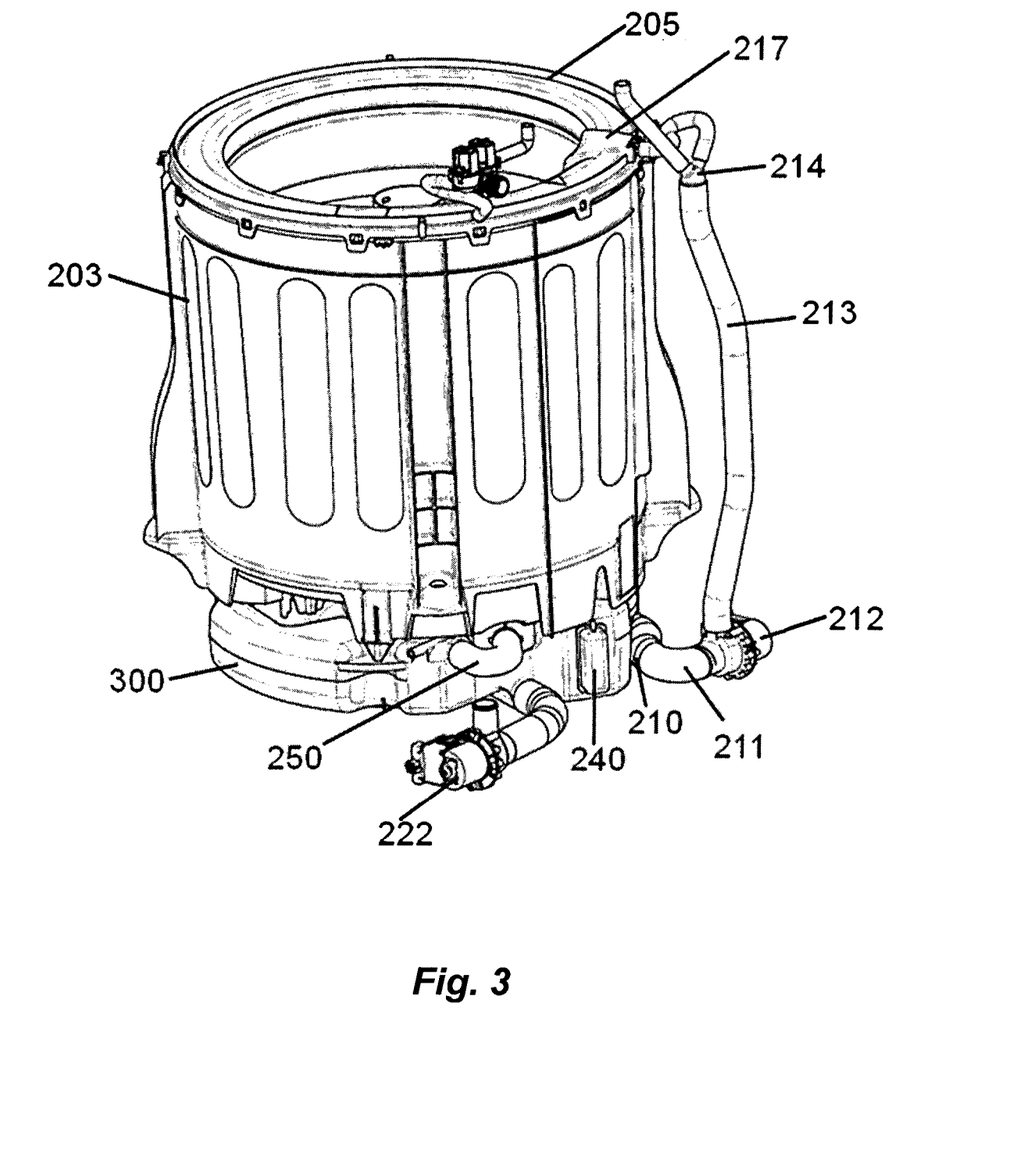
FIG. 3 is a posterior perspective view of the inside of the machine of FIG. 1, as per an embodiment of the invention.
Figure 4:
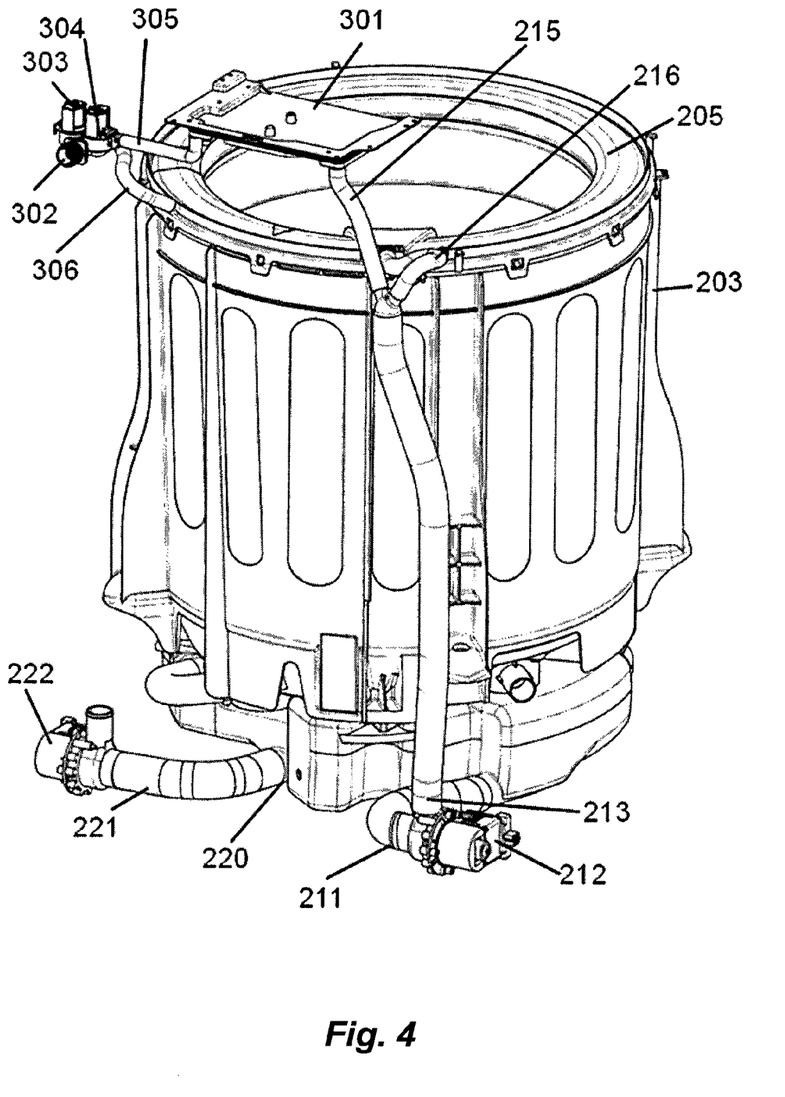
FIG. 4 is a perspective side view of FIG. 3.
Figure 5:
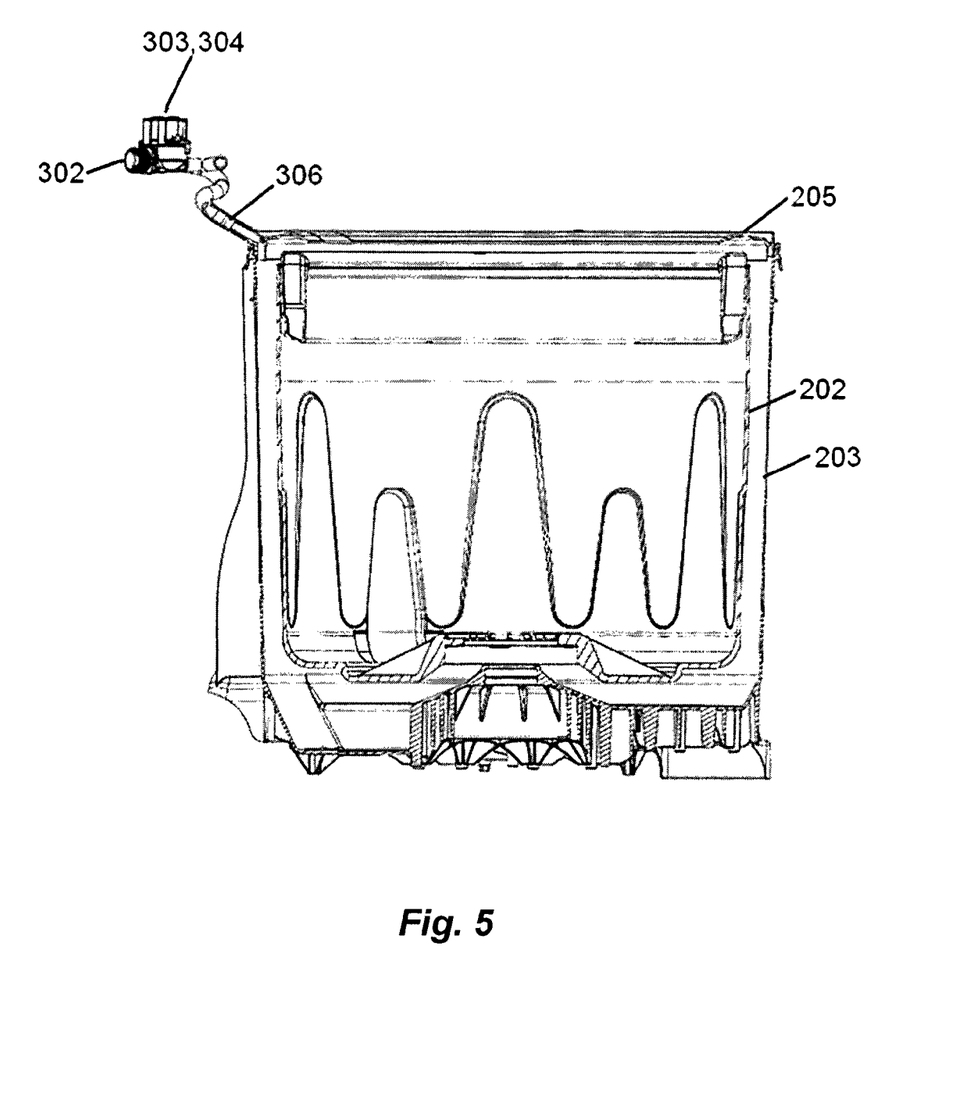
FIG. 5 is another side cross-section of the tank and of the tub of the machine of FIG. 2.

As can be seen, particularly in relation to FIGS. 2 and 5, there is provided an empty space between the wash tub (202) and the tank (203), both in relation to the side of the wash tub, and in relation to the lower portion thereof. There is also provided a fluid communication between the tank (203) and the reservoir (300) for storing water, by way of a conduit (250), for example, as can be better visualized in FIG. 3.

The laundry machine according to the invention also comprises the following technical characteristics, which will be better understood in the description of its mode of operation ahead.

There is provided an inflow of water (302) which is connected to the water feed from the mains, for example, by way of a hose (not shown) by conventional means. Alternatively, there can be provided two inflows of water (not represented), a cold water inflow and another for hot water, which may come from the residential or industrial pipes system. A valve, or a double valve (303, 304), such as solenoid valves, are disposed after the inflow of water from the mains to control the inflow of water from the mains to the machine. The inflow of water from the mains to the machine can be by two forms: passing through the device to store and dispense cleaning agents (301) by way of a conduit (305) which connects, on one side, to one of the valves (303) and, on the other side, to the device for storing and dispensing cleaning products; or wherein the water from the mains directed directly to the tank (203) also by way of a conduit (306) connected, on the one hand, to the other valve (304) and, on the other hand, to the cover of the tank (205), which consists of a ring fixed to the tank and which covers up the space existing between the tub and the tank in the upper portion of both.

In the lower portion of the machine, according to the invention, there is provided in a water storage tank (300) two outflows (210, 220). A first water recirculation outflow (210) which is connected between said tank (300) by way of a conduit (211) to the recirculation pump (212). From the recirculation pump, a second conduit (213) extends which, in its upper portion, is divided into two conduits (215, 216) of smaller diameter, a first conduit (215) that is in fluid communication with the device to store and dispense cleaning agents (300), and a second conduit (216) which extends to a water outflow mouthpiece (217), which is facing the inside of the tub (202).

The division of the conduit (213) into two conduit segments (215, 216) of smaller diameter can be carried out by way of shaping in polymerical material of the conduit itself or, also, by using a Y-shaped connector (214), such as represented in this embodiment.

Particularly, the mouthpiece (217) of the present invention is a mouthpiece that directs the flow of water to the walls of the wash tub, so as to assist in the rinsing step of the fabrics.

In the lowermost portion of the reservoir (300), there is provided a second outflow (220) for draining water that is potentially contained in said reservoir and that is not reused. This outflow may be in fluid communication with the water draining pump (222) by means of a conduit (221) connected, on the one side, to the drainage outflow (220) of the reservoir and, on the other, to the pump (222). The water may be drained to the sewage system by way of a specific conduit (not represented).

In an alternative embodiment of the invention, instead of using two pumps (a water recirculation pump (212) and another water draining pump (222)) in communication with two outflows, a single pump can be used that acts both for recirculating and for draining, and a valve can be select the path for directing the flow of water, whether to the inside of the tub or to the sewage system. In this embodiment, the reservoir may, potentially, comprise just one outflow.

The water reservoir (300), as can be verified from the representation in the drawings of the embodiment, is particularly a substantially cylindrical reservoir that contains an empty space in its central portion. The cylindrical shape allows the reservoir to adjust in the lower portion of a tank of a top-loading washing machine, whereas the central empty space enables all the mechanical and/or electrical drive elements of the impeller and/or of the tub (such as the electrical motor, the clutch and the planetary reduction gearbox) can pass through the reservoir without interfering with it.

Figure 6:
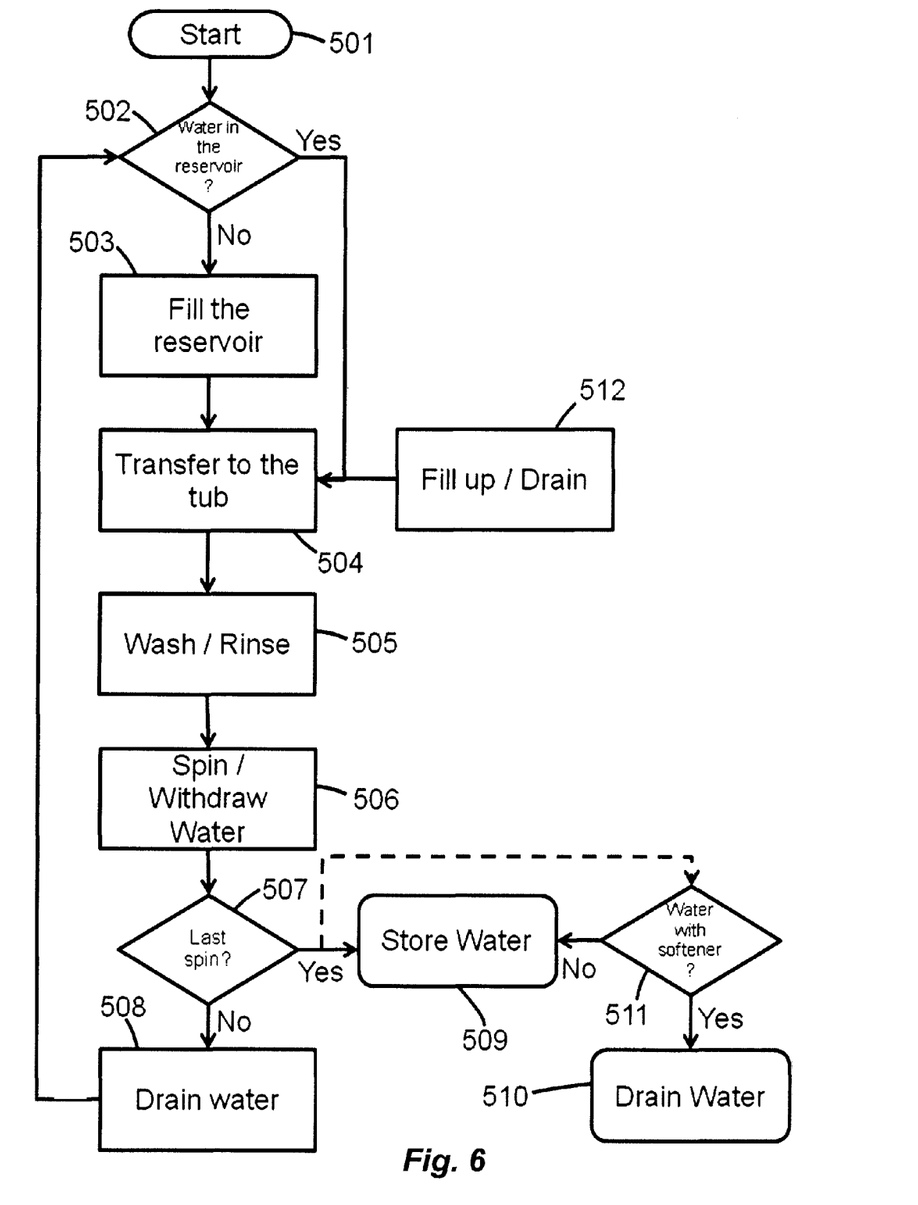
FIG. 6 is a flowchart of a washing process as per an embodiment of the invention.

The invention shall now be described in terms of its mode of operation, drawing reference to FIGS. 2 and 5 and, particularly, to FIG. 6, which represents a flowchart of a wash process using a laundry machine according to the invention.

The cycle begins (501) by verifying whether there is water stored for washing inside the reservoir, step (502). The verification of the existence or not of water contained inside the reservoir can be done by way of a pressure switch (240), which consists of a mechanical or electrical device for measuring pressure in a vase, mounted on one of the walls of the reservoir (300). The pressure switch can also estimate the quantity of water contained inside the reservoir and, accordingly, define whether it will be necessary to complement with more water from the mains to attain the necessary level for washing or, alternatively, draining the excess water that is inside the reservoir, as explained ahead.

If there is no water inside the reservoir, the tank is filled by feeding water from the mains, in step (503), which can be both by way of a single inflow of cold water or, alternatively, by an inflow of hot water or by both. In an alternative embodiment, the laundry machine comprises just an inflow of cold water, but has a resistance to heat the water.

Thus, one of both valves (303, 304) are opened and water begins to flow, on the one side, to the inside of the tank (203) by way of the conduit (306) and, on the other side, it flows to the device to store and dispense cleaning agents (301) to the inside of the tub (202) by way of another conduit (305). The opening of one or both valves shall depend on the step in which the washing cycle is found. Generically, the washing cycle consists of the steps of: (1) washing, in which a cleaning agent is added, such as powder soap or liquid detergent; (2) rinsing, in which clean water is used to withdraw the cleaning agent of the fabrics, followed, alternatively, by a step in which there is added a quantity of softener; and (3) spinning, which consists of withdrawing the excess water from the fabrics. Both the washing steps and the rinsing and spinning steps can be repeated one or more times during the washing cycle, as well as the step of spinning can be alternated with one or more steps of rinsing or washing. In this sense, the valve linking the water from the mains to the inside of the device to store and dispense can be opened only when on that washing cycle there is need to add a cleaning agent, such as soap, softener or bleach. Otherwise, if it is just the simple rinsing step, in which no cleaning agent is added, the valve may not be opened, and water is inserted only inside the tank, without passing through the storage and dispensing device.

Pursuant to the embodiment illustrated here, one of the valves (303) is opened to allow the inflow of water from the mains to the inside of the tank (203), and the second valve (304) is only destined to dispense the softener of the device to store and dispense cleaning agents, when the washing cycle arrives at the step of dispensing the softener in the tub (202), as explained ahead.

The device to store and dispense cleaning agents (300) can be any device known in the state of the art, comprising specific compartments to store the cleaning agent and valves or connectors so that the water is released inside one or more compartments, depending on the washing cycle, and water containing the cleaning agent is poured into the inside of the tub (202). Put otherwise, if it is the first washing cycle, water can be directed to the soap storage compartment. If it is the final rinsing step, it can be directed to the compartment where the softener is stored, and so forth. Said devices for storing and dispensing cleaning agents are known in the state of the art, which is why no more detailed description thereof shall be made during the course of the present specification.

As mentioned at the start of the process, if there is no water in the tank or reservoir (300), the tank begins to be filled by the water coming from the mains. As can be noted, the water is not directed directly to the wash tub, as is common in the laundry machines of the state of the art, but to the tank (203) which encircles the tub. The tank, as already described, is in fluid communication with the reservoir through the conduit (250) and, accordingly, the water from the mains which is dispensed inside the tank runs therefrom to the inside of the reservoir (300) by way of the conduit (250).

Since the water filling is done directly in the tank (203) and, consequently, in the reservoir (300), the laundry machine of the invention, advantageously, comprises a tub (202) substantially without openings or holes or, in other words, a tub that does not comprise a fluid communication with the tank when the cycle is in the washing step. Hence, particularly, the tub of the machine of the present invention does not present substantially any fluid communication with the tank and, therefore, the water that is inserted inside the tank is not diverted to or enters into contact with the inside of the tub.

However, in an alternative embodiment, the tub of the laundry machine according to the invention can be a conventional tub having holes and, consequently, in fluid communication with the tank.

Once the desired water level is attained for the washing, the filling of water from the mains is stopped, by closing the valves (303, 304), for example. The desired quantity of water can be determined by the pressure switch (240), as mentioned above, and also be the user, since many laundry machines have a command by which the user can choose the desired level or the quantity of water for the washing. In an alternative embodiment, this level may be determined automatically by the machine, depending on the quantity of closing inserted in the tub. Some laundry machines have systems for determining the quantity of clothing inserted in the tub and, therefore, may, by automated means, determine the quantity of water necessary for the washing cycle.

The water contained in the tank and, potentially, in the reservoir, if the water level exceeds the capacity of the reservoir, is then transferred to the inside of the tub, step (504), by way of the recirculation pump (212), passing through the conduit (213) and its bifurcation (215, 216). As it is possible to verify, part of the water will be directed directly to the outflow mouthpiece (217), and part of the water will be directed to the device to store and dispense cleaning agents (301), which may be necessary if the first cycle is performed with reused water, as explained at the end of this description.

Particularly, the water coming from the reservoir which is diverted to the device to store and dispense cleaning agents (301) by the conduit (215) passes only through the compartment destined to receive soap, only to dispense soap inside the tub (202), whereas the softener is dispensed by the water coming from the mains by opening the valve (304).

The tub (202) is then filled with water and the process of washing the fabrics begins, step (505), by the alternate movement of the impeller and, potentially, also of the wash tub.

After finalizing the washing cycle, it is necessary the drain the water from the inside of the tub. Since there is no fluid communication between the tub and the tank or reservoir, draining the water contained inside the tub is performed when the tub in spun, step (506), particularly at growing angular speed, and the water contained therein will be impelled against its walls and, due to the centripetal force, naturally the water will tend to rise up the inner walls of the tub in the sense of the opening existing between the tub and the tank, in the upper portion protected by the cover (205) which, in turn, prevents that water from squirting outside the tub and, at the same time, directs it directly against the inside of the tank (203). The water used in washing then returns to the tank and, consequently, to the reservoir (300).

Posteriorly, it is verified whether the spin performed to eliminate the water from the tub is the last spin occurred after the washing process, step (507). In other words, whether the tub will be filled again, for new step of washing and/or rinsing or, else, if it was the last rinse performed during the washing process and the respective spin.

If it is not the last spin, the water used is totally drained, step (508), and the process is resumed in step (502), to fill up again the tank and the reservoir from the mains, and the cycle follows on as described above.

On the other hand, if it is the last spin, the water from the last rinse can be stored in the reservoir, step (509), and used in the next washing cycle.

In this sense, when the next washing cycle starts, the process can identify whether there is water stored in the reservoir, step (502), and begin filling the tub by way of the recirculation pump (504), instead of the mains, and accordingly, by bifurcation (215, 216) of the conduit (213), part of the water is directed to the device to store and dispense cleaning agents (301), such that soap powder, for example, is also dispensed in the tub (202), and part of the water is directed directly to the tub through the mouthpiece (217), and the process as already described above begins.

In an alternative embodiment, it is verified whether softener was used in the last rinsing cycle, step (511). If softener was used, the water is then drained, in step (510), and the washing cycle is finalized, keeping the reservoir empty. On the other hand, if softener was not used in the last rinsing cycle, the water is stored (509) in the reservoir for the next wash. This alternative embodiment can be desirable when there is no wish to store water in the reservoir with cleaning agents. The verification of the use, or not, of softener in the last rinsing cycle can be carried out, for example, by means of a command by the user in the sense that softener is not used in that washing cycle and, accordingly, softener is not dispensed by the device to store and dispense cleaning agents inside the tub. Particularly, as per the embodiment described herein, if softener is not used in the last step of the washing cycle, the valve (304) does not open and, therefore, water is not directed to the device to store and dispense cleaning agents (301). As described above, the conduit (305) connected, on the one hand, to the valve (304) and on the other hand to the device to store and dispense cleaning agents (301) is destined only for dispensing the softener of said device. Naturally, alternative embodiments may be proposed such as, for example, having a device to store and dispense cleaning agents (301) having valves to dispense selectively the cleaning agent.

Figure 7:
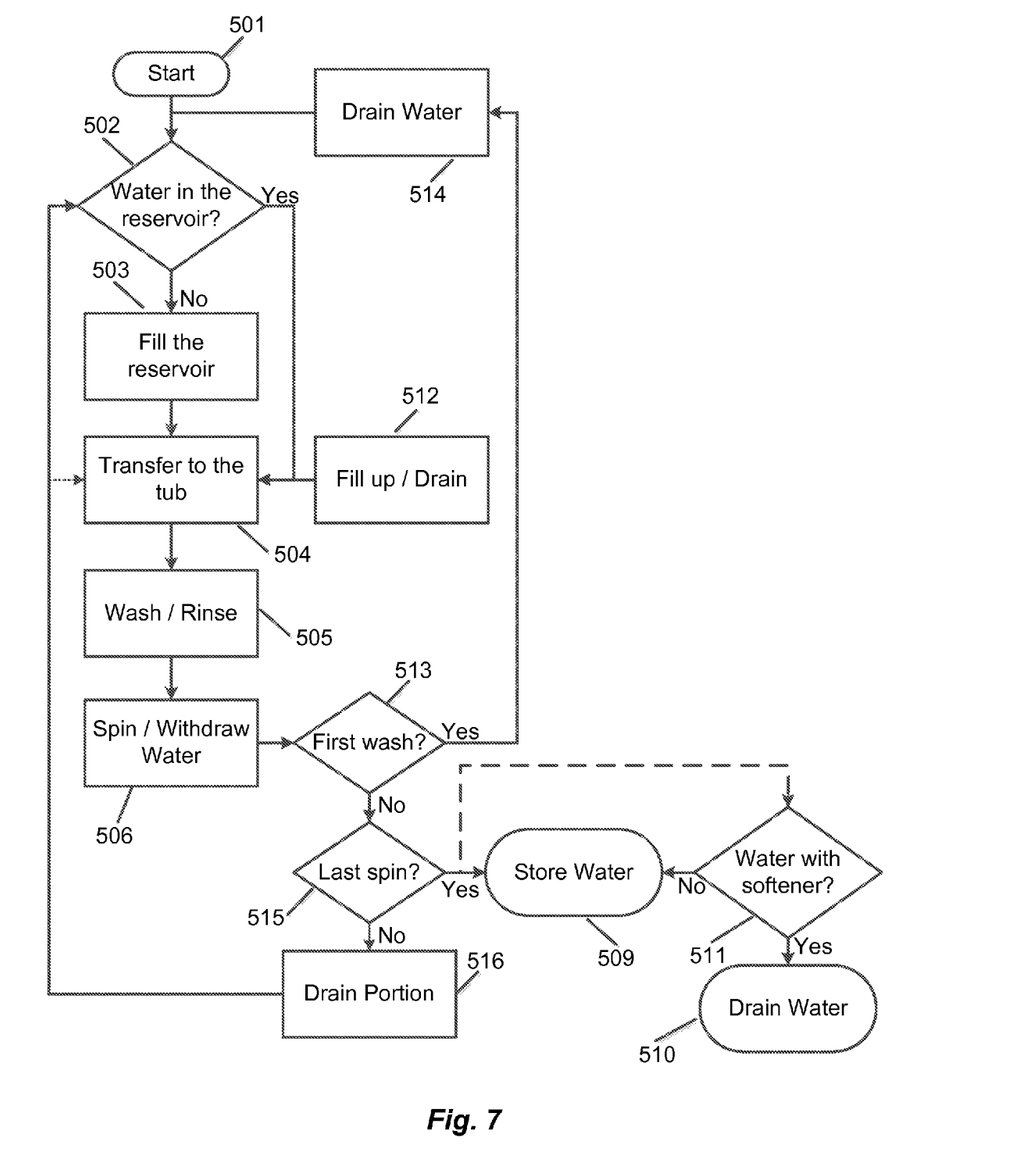
FIG. 7 is a flowchart of a washing process as per another embodiment of the invention.

In another alternative embodiment of the process of the invention, as represented in FIG. 7, the water that was withdrawn from the tub by spinning, step (506), is not totally drained from the tank and the reservoir, but only the excess water in relation to the reservoir storage capacity is drained, and the water can be reused for the next step of the washing cycle, and the process begins in steps (502) and (503) by reusing the residual water from the prior cycle which was kept in the reservoir (300). In this embodiment, therefore, the process follows the same steps 501 to 506 described above. However, it additionally comprises the step of checking whether the water that was withdrawn from the tub is the water of the first wash, step (513). Since generally the water of the first wash is saturated with soap surfactants used in the washing and with dirt of the fabrics, it would not be advantageous to reuse the water from the first washing step of the fabrics. In this case, the water is totally drained from the tank and the reservoir, step (514) and the process restarts in step (502). If it is not the water of the first wash, it is checked whether it is the last spin carried out in the washing cycle, step (515). If it is not the last spin, there is drained only a quantity of water that exceeds the reservoir storage capacity (300), in step (516), and the process restarts in steps (502) and (504) by transferring the water contained in the reservoir to the inside of the wash tub to the next step of the washing cycle and the process again follows steps (505) to (515). If it is the last spin inside the washing cycle, the water is then stored in the reservoir for the next washing cycle, step (509). In this same alternative embodiment, the process may comprise the other steps already described of checking for the existence of softener and drainage, or not, of the water, steps (510) and (511).

This embodiment described above is particularly advantageous since it always keeps the reservoir (300) full and, with this, the weight exercised by the water on the bottom of the tank and wash tub combination acts as a counterweight to balance the washing combination (tub and tank) at the point of spinning. Accordingly, the laundry machine and the process of the invention allow the spin to be carried out with lesser vibration, chiefly at the start of the spin step, in which the tub is continuously accelerated from rest to maximum spin speed. Precisely at the start of the spin step is when the most unbalancing of the washing combination occurs due to the fabrics contained in the tub, and the full reservoir helps maintain more uniform balance of the washing combination.

In another alternative embodiment, the water stored in the reservoir may not be sufficient to complete the level of water necessary inside the tub, then the process of the invention may also comprise the step of completing the water level in the tub with water from the mains, step (512), after emptying the reservoir.

In yet another alternative embodiment, the water contained in the reservoir can be in a greater volume than that necessary for the washing cycle, and then the process of the invention also comprises the step of draining the excess water contained in the reservoir, also step (512).

According to another alternative embodiment, the water stored in the reservoir may undergo a treatment, such as a cleaning or sterilization treatment, as described, for example, in patent application BR 2011/0045062, entitled "Washing machine having an external reservoir with an integrated water treatment system by antimicrobial agent".

It must be considered that although the invention has been described in relation to a particular embodiment, persons skilled in the art will be able to propose a series of structural or application alterations without straying from the principles disclosed herein. Therefore, the accompanying claims should be interpreted as encompassing all and any equivalents that fall within the object of the invention.

The invention claimed is:

1. A washing process for a top-loading laundry machine, the laundry machine including
   an impeller;
   a wash tub;
   at least one of a mechanical and an electric drive element for driving said impeller and said tub;
   a tank encircling said wash tub; and
   a reservoir in fluid communication with said tank and disposed below said tank and said wash tub and arcuately encircling said at least one of a mechanical and an electric drive element from one side thereof at least to an opposite side thereof,
   the washing process comprising the steps of:
   (a) adding water to the reservoir from water mains, if a quantity of water in the reservoir is less than a required quantity;
   (b) transferring water from the reservoir to the tub;
   (c) performing at least one of washing and rinsing;
   (d) spinning the tub to withdraw water from the inside of the tub to the tank to flow to the reservoir;
   (e) draining the water withdrawn from the tub from the reservoir to a sewage system and returning to step (a), if the spinning of step (d) is not a last spin; and
   (f) storing the water withdrawn from the tub in the reservoir, if the spinning of step (d) is the last spin.

2. A process, as claimed in claim 1, additionally comprising the steps of:
   (g) determining whether softener was used in the washing cycle, if the spinning of step (d) is the last spin; and
   (h) draining the water, if softener was used.

3. A process, as claimed in claim 1, additionally comprising the step of completing a fill of the tub to a water level with water from the mains after step (b).

4. A process, as claimed in claim 1, additionally comprising the step of draining water from the reservoir after step (b).

5. A process, as claimed in claim 1, additionally comprising a step of at least one of cleaning and sterilizing the stored water.

6. A process, as claimed in claim 1, wherein the reservoir is encompassed within a vertical footprint of the tank.

7. A washing process for a laundry machine, the laundry machine including:
   an impeller;
   a wash tub;
   at least one of a mechanical and an electric drive element for driving said impeller and said tub;
   a tank encircling said wash tub; and
   a reservoir in fluid communication with said tank and disposed below said tank and said wash tub and encircling, at least partially, said at least one of a mechanical and an electric drive element,
   the washing process comprising the steps of:
   (a) adding water to the reservoir from water mains, if a quantity of water in the reservoir is less than a required quantity;
   (b) transferring water from the reservoir to the inside of the tub;
   (c) performing at least one of washing and rinsing;
   (d) spinning the tub to withdraw water from the inside of the tub;
   (e) draining the water withdrawn from the tub to a sewage system and returning to step (a), if the water withdrawn from the tub is water from a first wash;
   (f) draining a quantity of the water withdrawn from the tub to the sewage system and transferring a portion of the water withdrawn from the tub to the reservoir and returning to step (a) to continue therefrom, if the spinning of step (d) is not a last spin of a washing cycle and the water withdrawn from the tub is not water from the first wash; and
   (g) storing the water withdrawn from the tub in the reservoir, if the spinning of step (d) is the last spin of the washing cycle.

8. A process, as claimed in claim 7, wherein the quantity of water withdrawn from the tub in step (f) is a quantity of the water withdrawn from the tub that exceeds a reservoir storage capacity.

* * * * *